United States Patent

[11] 3,627,978

| [72] | Inventors | Tadashi Endo;<br>Mitsuhiro Sakagami, both of Funabashi-shi; Hiroshi Nomura; Masamichi Suzuki; Takeshi Araya, all of Tokyo, Japan |
|---|---|---|
| [21] | Appl. No. | 811,825 |
| [22] | Filed | Apr. 1, 1969 |
| [45] | Patented | Dec. 14, 1971 |
| [73] | Assignee | Hitachi, Ltd.<br>Tokyo, Japan |

[54] AUTOMATIC ARC WELDING METHOD
3 Claims, 39 Drawing Figs.

[52] U.S. Cl. ............................................. 219/137,
219/74
[51] Int. Cl. ................................................ B23k 9/00
[50] Field of Search ................................. 219/73, 74,
76, 130, 131, 137; 117/205

[56] References Cited
UNITED STATES PATENTS

| 1,936,799 | 11/1933 | Mathias | 117/205 X |
| 2,773,970 | 12/1956 | Galbraith et al. | 219/131 F |
| 3,223,818 | 12/1965 | Chyle | 219/73 |
| 3,473,002 | 10/1969 | Suzuki | 219/74 X |
| 2,837,627 | 6/1958 | Soulary | 219/137 |
| 3,125,671 | 3/1964 | Manz | 219/131 |
| 3,130,295 | 4/1964 | Manz | 219/131 |

Primary Examiner—C. L. Albritton
Attorney—Craig, Antonelli & Hill

ABSTRACT: An automatic arc welding method characterized by using an AC power source having a slowly falling characteristic close to a constant voltage characteristic, selecting the arc voltage and welding current so that the mode of transfer of molten metal from an electrode wire to a base metal becomes pure spray-type one or spray-type one accompanied by periodic short circuit, and automatically feeding said electrode wire, thereby depositing the molten metal of said wire onto said base metal.

INVENTORS
TADASHI ENDO, MITSUHIRO SAKARAMI,
HIROSHI NOMURA, MASAMICHI SUZUKI,
AND TAKESHI ARAYA

BY Craig, Antonelli, Stewart & Hill

ATTORNEYS

| WELDING POSITION | |
|---|---|
| FLAT BUTT | |
| HORIZONTAL FILLET | |
| FLAT FILLET | |
| OVERHEAD HORIZONTAL FILLET | |
| OVERHEAD FILLET | |
| VERTICAL FILLET | |
| HORIZONTAL BUTT | |

→ WIRE FEEDING DIRECTION

IMMEDIATELY AFTER WELDING

AFTER THE PEEL-OFF OF SLUG

IMMEDIATELY AFTER WELDING

AFTER THE PEEL-OFF OF SLUG

INVENTORS
TADASHI ENDO, MITSUHIRO SAKAGAMI,
HIROSHI NOMURA, MASAMICHI SUZUKI,
AND TAKESHI ARAYA

BY Craig, Antonelli, Stewart & Hill

ATTORNEY

AUTOMATIC ARC WELDING METHOD

BACKGROUND OF THE INVENTION

1. Field of the Invention

This invention relates to an automatic arc welding method employing an AC welding power source, and more particularly, a welding method providing an arc shielded with carbon dioxide gas employing a composite wire.

The term "automatic welding" used in this specification refers to such welding techniques that use is made of consumable electrode wire or wires which are automatically fed to a weld spot by wire-feeding means driven by an electric motor so that an arc may be maintained between the tip portion of the wire and a base metal or workpiece thereby to deposit the molten metal of the electrode wire onto said base metal, including both the full automatic welding technique to effect welding while moving a welding torch resting on a traveling truck and the semiautomatic welding technique to effect welding while manually moving the welding torch.

2. Description of the Prior Art

As all-position automatic arc welding method, there has recently been developed a method wherein use is made of a small diameter solid wire and arc welding is effected in a shield gas by the use of a DC welding power source having a constant voltage characteristic (including a rising or falling characteristic close to constant voltage characteristic).

Conventionally, an AC welding power source having a drooping characteristic (constant current characteristic) has extensively been used in the fields of so-called manual welding wherein a welding rod is manually fed. However, an AC welding power source has seldom been employed in the field of automatic welding. It has already been attempted to use an AC power source having a drooping characteristic for the purpose of effecting carbon dioxide gas-shielded arc welding. In that case, the mode of transfer of molten metal from an electrode wire to a base metal turns out to be of the type intermediate between the drop (globular) type and the spray type. That is, there is the tendency that molten metal is likely to fall from the tip of the electrode wire due to the fact that there exists a considerable mass of dropping molten metal in addition to that discharged in a fine particlelike or spraylike form from the tip of the electrode wire. Therefore, it has been considered that the welding position is to be limited to flat and that welding at other positions such as horizontal, vertical, and so forth is difficult to effect.

In the case of automatic arc welding effected by the use of a DC welding power source having a constant voltage characteristic, the arc per se produces self-controlling action to maintain the arc length constant. In the case of automatic arc welding effected by the use of an AC power source having a drooping characteristic, however, such self-controlling action is not produced. Obviously, therefore, the method suffers by comparison with the latter DC automatic arc welding method with respect to arc stability and weld finish. In the case of DC automatic arc welding, the mode of transfer of molten metal from an electrode wire to a base metal varies depending upon the relationship between the arc voltage and the current. In a region where the welding current and arc voltage are relatively high, the mode of transfer becomes the spray type, while in a region where the current and arc voltage are relatively low, it becomes the short circuit type which refers to a transfer mode wherein periodic short circuit is repeatedly caused between the wire and the base metal and when such short circuit occurs the transfer of molten metal from the wire to the base metal is caused. In either case, all-position welding including horizontal and vertical is possible. For such reason, a DC welding power source having a constant voltage characteristic has heretofore been dominantly employed in the field of automatic arc welding. However, the automatic arc welding effected by the use of a DC welding power source is disadvantageous in that difficulty is encountered in the selection of welding conditions because the welding result is remarkably influenced by the degree of slope of the external characteristic curve representing the static and dynamic characteristics of the power source and the impedance contained in the welding current circuit, and that in the case of the three-phase, full-wave rectifier system which is usually used as the welding power source, for example, it is necessary to resort to a combination of a three-phase transformer, rectifiers and saturable reactor, so that the cost becomes three times higher than in the case where use is made of an AC welding power source.

SUMMARY OF THE INVENTION

It is an object of the present invention to provide an automatic arc welding method of achieving a stabilized arc and excellent weld finish by using an inexpensive AC welding power source facilitating the selection of welding conditions.

Another object of the present invention is to improve the working property by making possible all-position welding including horizontal and vertical which has heretofore been considered to be difficult to achieve in the case of AC automatic arc welding.

The gist of the present invention resides in an automatic arc welding method characterized by using an AC welding power source of which the external voltage-current characteristic is made to be a falling characteristic close to a constant voltage characteristic with a low secondary no-load voltage and a high short circuit current as compared with an AC power source having a drooping characteristic adapted to provide an equal rated output thereby to provide a welding arc with self-controlling action, maintaining such arc between the tip portion of an electrode wire or wires and a base metal or workpiece while continuously feeding said electrode wire or wires to the base metal by wire feeding means driven by an electric motor, and selecting the relationship between the arc voltage and the welding current so that the mode of transfer of molten metal from the electrode wire to the base metal becomes the pure spray type or the spray type accompanied by periodic short circuit, thereby depositing the molten metal of said electrode wire onto the base metal.

The spray-type transfer accompanied by periodic short circuit referred to above is such that the tip portion of an electrode wire is caused to periodically contact a molten pool of a base metal so that the wire and base metal are electrically short-circuited with each other and at the next moment the short circuit between the wire and the base metal is eliminated by the action of an electrical force resulting from a short circuit current so that an arc is again produced, and during the occurrence of such arc, the molten metal of the wire is transferred in a fine particle like or spray like form onto the base metal.

It has heretofore been considered that an AC power source having a constant voltage characteristic is unsuitable for arc welding since the current is so greatly varied with a change in the arc length that the arc becomes unstable. However, the inventors have found that a stable arc can be maintained under various welding conditions in accordance with the method of the present invention, which has many advantages that cannot be realized by the use of an AC power source having a drooping characteristic.

In the case where carbon dioxide gas shielded arc welding is effected by using an AC power source having a falling characteristic close to a constant voltage characteristic in accordance with the method of the present invention, a stable arc with a less quantity of spatter is produced and the deposition rate is increased as compared with the case where such welding is effected by the use of an AC power source having a drooping characteristic. In addition, all-position welding including horizontal and vertical is possible.

Furthermore, in accordance with the method of the present invention, it is possible to achieve excellent welding without using shield gas, by employing as the electrode wire a no-gas welding composite wire having a core containing deoxidizing flux and gas-generating agent such as $CaCO_3$ which is decomposed by the arc heat to produce $CO_2$ gas.

Other objects, features and advantages of the present invention will become apparent from the following description taken in conjunction with the accompanying drawings.

DESCRIPTION OF THE PREFERRED EMBODIMENTS

Figure 1:
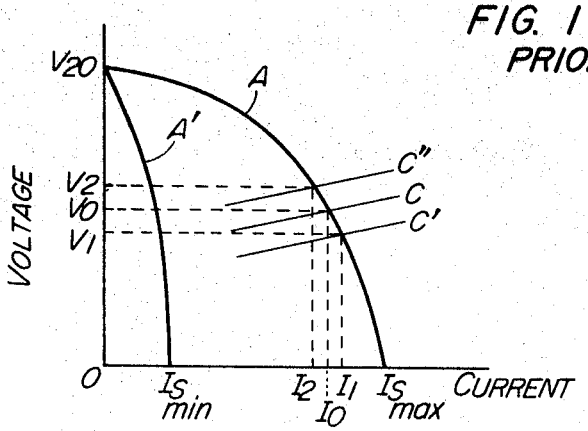
FIG. 1 is a view showing external characteristic curve of a conventional AC welding power source.

In FIG. 1, the curve A represents the external characteristic of the conventional AC welding power source of which the secondary no-load voltage is normally 70 to 80 volts. This characteristic is referred to as a drooping characteristic or a constant current characteristic because the curve has a high drooping degree. The external voltage-current characteristic of an AC welding power source employed in the present invention is a slowly falling characteristic similar to a constant voltage characteristic with a decreased secondary no-load voltage $V_{20}$ (about 35 to 45 volts) and an increased short circuit current as compared with a power source representing a drooping characteristic which provides an equal rated output, as shown by the curve B in FIG. 2. This characteristic is characterized by the self-controlling action of the welding arc. Comparison between the power sources having the characteristics shown in FIGS. 1 and 2 will now be made with respect to variations in voltage and current with variations in arc length. In these figures, let it be assumed that $c$, $c'$ and $c''$ are arc characteristic curves when the arc length is $L_0$, $L_1$, and $L_2$ respectively. Then it will be readily apparent that when the arc length is changed from $L_0$ to $L_1$ or $L_2$, the current is far more greatly changed in the case of the characteristic of FIG. 2 than in the case of FIG. 1. For example, if the arc length is decreased from $L_0$ down to $L_1$, then there occurs a great increase in the current from $L_0$ up to $L_1$ in the case of FIG. 2, so that the melting rate of an electrode wire is increased, with the result that there is produced self-controlling action by which the arc length tends to be automatically returned to the original state, with a relatively small voltage change $V_0-V_1$. In contrast, in the case of FIG. 1, the increase of the current $I_0-I_1$ is so slight that there is produced less capability of returning the arc length to the original state, while there occurs a greater increase in the voltage $V_0-V_1$.

Thus, in the case where the power source having the characteristic shown in FIG. 1 is used for automatic arc welding, once the arc length has become shorter than a predetermined value, its return to such value is delayed so that it becomes shorter and shorter until there occurs the danger that the wire and the workpiece are short-circuited so that the arc becomes unstable. In the case where the power source having the characteristics shown in FIG. 2 is employed, the danger of short circuit is reduced by virtue of the self-controlling action of the arc which results from a great increase in the current, so that the arc can be kept stable.

Figure 2:
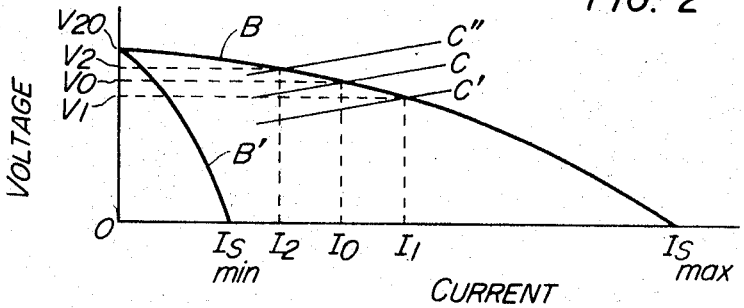
FIG. 2 is a view showing the external characteristic curve of an AC welding power source which is employed in the present invention.

In FIG. 2, the closer to a horizontal line the curve B is made, the more greatly the current with variation of the arc length is changed. However, an excessive change in the current has adverse effect on the stability of the arc. Furthermore, it becomes more likely that spatter is caused due to an excessive short circuit current which flows when the arc space is short-circuited by the molten metal.

In order to improve the stability of an arc and minimize the possibility that spatter is caused, therefore, it is preferable to use a welding power source having an external characteristic falling more abruptly than a constant voltage characteristic in the strict sense of the word as shown by the curve B' in FIG. 2, in combination with a method to control the wire-feeding speed in accordance with the arc voltage thereby to keep the arc length constant.

The mode of transfer of the molten metal from the electrode wire to the parent metal or workpiece varies depending upon the relationship between the arc voltage and the current. The general tendency is such that in such a range where the current is low and the arc voltage is high, there occurs a drop-type transfer mode while in a range where the current is high and the arc voltage is low, there occurs a pure spray-type transfer mode or a spray-type transfer mode accompanied by periodic short circuit.

In an attempt to effect carbon dioxide gas shielded arc welding by the use of an AC welding power source with a falling characteristic, it is possible to achieve a pure spray-type of transfer of molten metal or a spray-type transfer accompanied by periodic short circuit whereby all-position welding including horizontal welding and vertical welding can be performed, by making the wire-feeding speed higher and the arc length shorter than in the case where it is attempted to effect carbon dioxide gas shielded arc welding by the use of an AC welding power source having a drooping characteristic.

Figure 3:
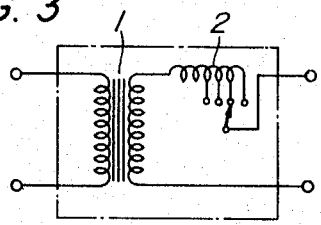
FIGS. 3 through 5 are circuit diagrams showing examples of the AC welding power source employed in the present invention, respectively.
Figure 4:
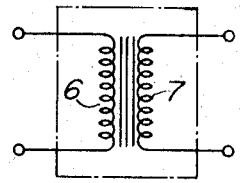
Figure 5:
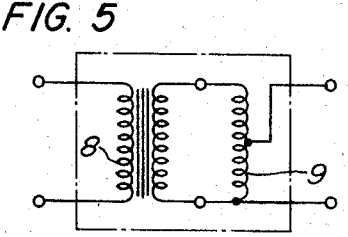

Referring to FIGS. 3 to 5, there are shown three examples of the arrangement of a power source adapted to represent such characteristic as shown in FIG. 2.

FIG. 3 shows an AC welding power source which is adapted to represent the required external characteristic by connecting a suitable reactor 2 with an ordinary transformer including a no leakage flux path, wherein the current adjustment is carried out by switching the taps of the reactor 2.

Figure 6:
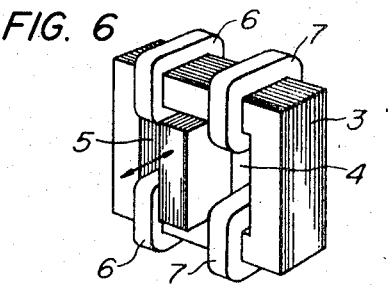
FIG. 6 is a perspective view showing the construction of an example of welding transformer.

FIG. 4 shows an AC welding power source of the leakage transformer type which is specially designed so as to represent an external characteristic with a less drooping degree. This power source comprises a U-shaped fixed core 3, a movable core 5 adapted for movement into and out of a window 4 of the fixed core, and primary and secondary coils 6 and 7 which are wound on each of the upper and lower leg portions of the fixed core in such a manner as to hold the movable core therebetween, as shown in FIG. 6. The two pairs of primary and secondary coils 6 and 7 are connected in series or parallel to each other, and leakage flux paths are established therebetween through the movable core 5. Thus, a current flowing through the secondary coil can be continuously changed by moving the movable core.

FIG. 5 shows a system adapted to represent the required external characteristic, such as shown in FIG. 2, wherein an auxiliary transformer 9 with a suitable turn ratio (2:1, for example) is connected with the secondary winding of an AC welding power source 8 having such drooping characteristic as shown in FIG. 1. The main power source 8 may be of such construction as shown in FIG. 6, for example, and the current adjustment can be carried out by moving the movable core of the main power source 8.

With any of the types shown in FIGS. 3 to 5, it is possible to reduce the cost by one-third to one-quarter as compared with a DC welding power source.

Figure 7:
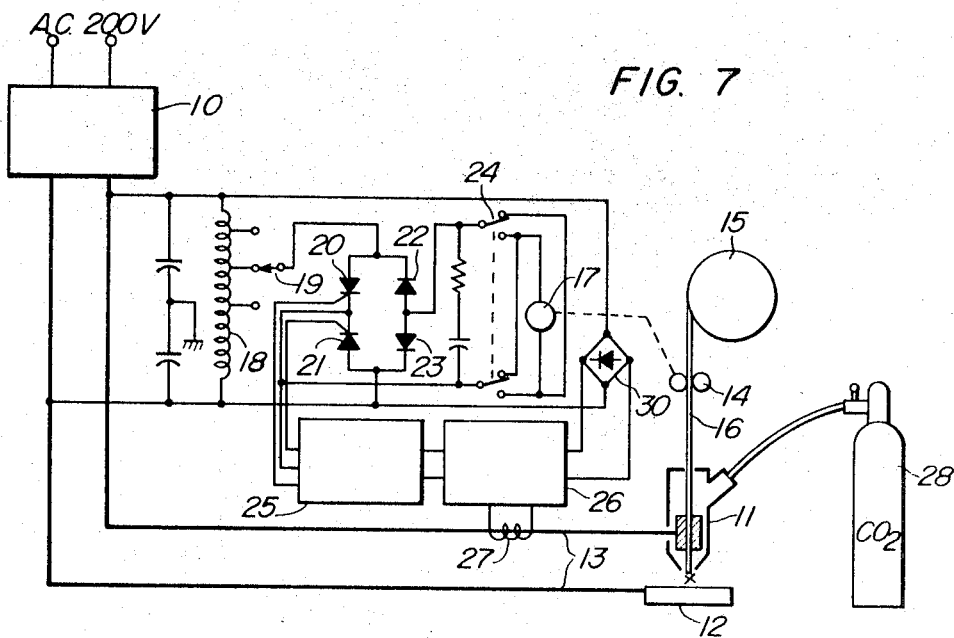
FIG. 7 is a connection diagram showing an example of welding equipment adapted for carrying out the method of the present invention.
Figure 8:
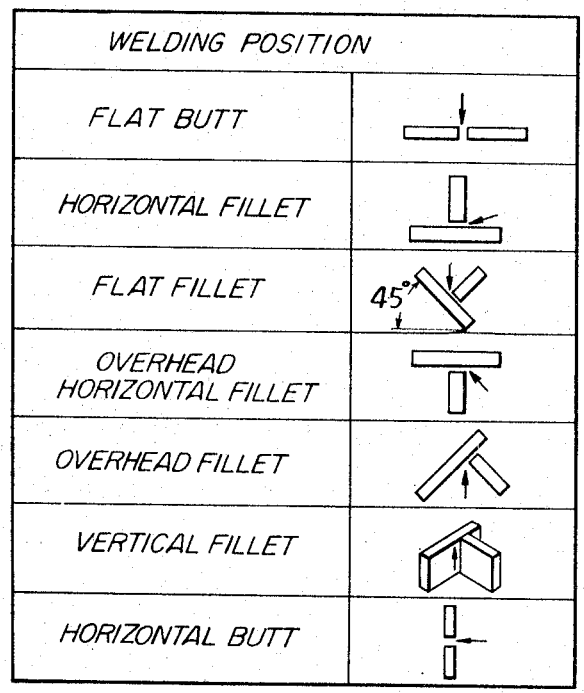
FIG. 8 is a view useful for explaining welding positions.
Figure 9:
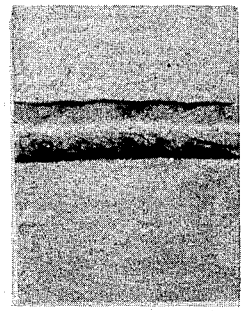
FIGS. 9 through 24 are photographs showing the appearances of beads produced by effecting semiautomatic welding with respect to soft steel in accordance with the method of the present invention, respectively.
Figure 10:
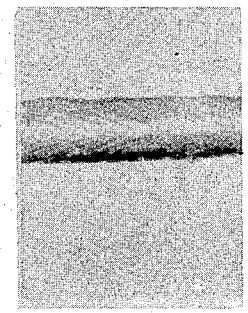
Figure 11:
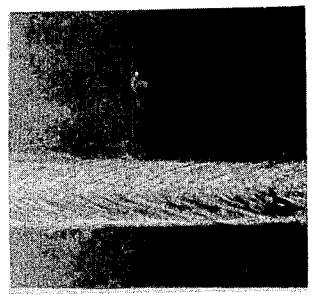
Figure 12:
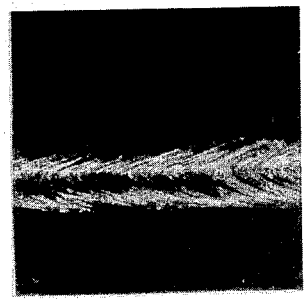
Figure 13:
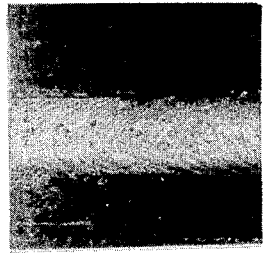
Figure 14:
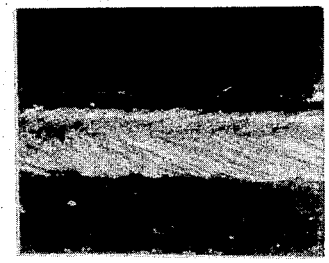
Figure 15:
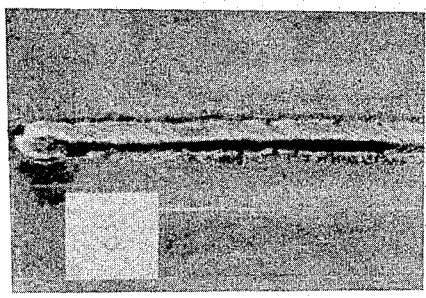
Figure 16:
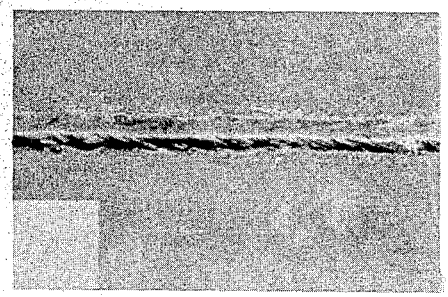
Figure 17:
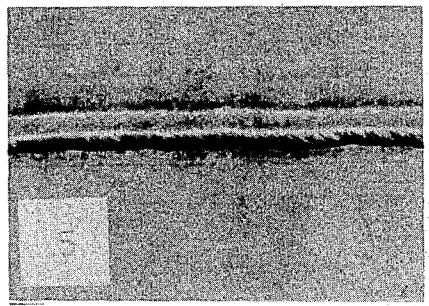
Figure 18:
Figure 19:
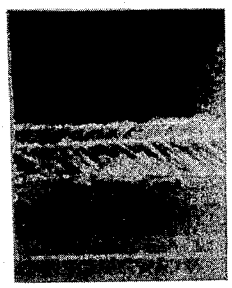
Figure 20:
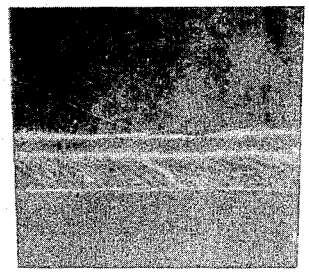
Figure 21:
Figure 22:
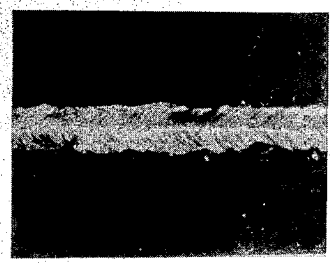
Figure 23:
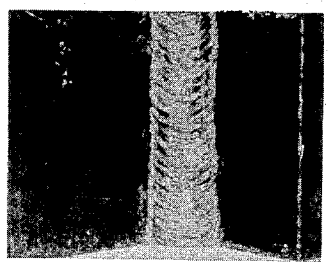
Figure 24:
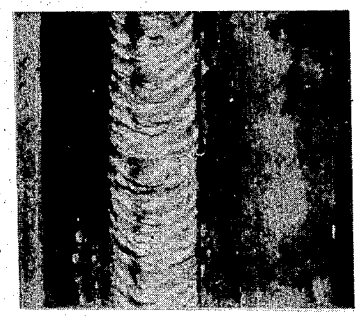

Referring to FIG. 7, there is shown an example of welding equipment for carrying out the method of the present invention, which is a semiautomatic arc welding equipment wherein an AC welding power source 10 having such characteristic as shown in FIG. 2 has its output terminals connected with a welding torch 11 and a workpiece 12 through cables 13, and in the torch 11, power is supplied to an electrode wire 16 which is fed to the torch 11 from a wire reel 15 with the aid of feed rollers 14, as is well known in the art. The feed rolls 14 are driven by an electric motor 17 which is energized by the AC welding power source 10 through an autotransformer 18, tap changer 19, controlled rectifiers 20, 21, rectifiers 22, 23 and rotating direction-changing switch 24. Numeral 25 represents a pulse generator for supplying gate signals to the controlled rectifiers 20 and 21 and which is constituted by an oscillator circuit using unijunction transistors or the like wherein the pulse phase is adjustable. Numeral 26 indicates a current relay which is operated by the secondary output of a transformer 27 inserted in the welding current circuit and which may be constituted by semiconductor switching elements such as transistors. Numeral 28 denotes a gas bomb from which shield gas is supplied to the torch 16, and 29 is a gas supply pipe.

In the foregoing equipment, shield gas is discharged from the nozzle of the torch 16, and power is supplied from the AC welding power source to the electrode wire 16 and workpiece 12 so that an arc is produced between the tip portion of the electrode wire and the workpiece. At this point, the current relay 26 is operated so that the pulse generator 25 is energized by the rectifier 30 so as to produce an oscillation. By the pulse output of the pulse generator, the controlled rectifiers 20 and 21 are alternately rendered conductive for each half-cyclic period so that a voltage proportional to the arc voltage is applied to the electric motor 17 by which the rollers 14 are rotated in the feeding direction at a speed proportional to the voltage applied to the motor. In this way, the wire-feeding speed is controlled in accordance with the arc voltage so that welding can be effected, with the arc length maintained constant. The wire-feeding speed can be adjusted by changing over the taps of the autotransformer 19 and adjusting the phase of the pulses available from the pulse generator 25. By increasing the wire-feeding speed, the arc length is reduced so that the arc voltage is decreased, whereas by decreasing the wire-feeding speed, the arc length is increased so that the arc voltage is increased.

By the use of a no-gas welding composite wire containing a gas generating agent as electrode wire, it is unnecessary to discharge shield gas from the torch nozzle.

Description will now be made of the results of a welding experiment performed by the use of the equipment shown in FIG. 7 (Hitachi Model AT-SSL 600A). The specification of the welding power source in use is as follows:

Rated primary voltage: 200 v.
Secondary no-load voltage: about 42 v.
Secondary current adjusting range: 140 to 620 a.
Maximum short circuit current: about 1,000 a.
Rated frequency: 50 or 60 c.p.s.

With the aforementioned equipment, the carbon dioxide gas shielded arc welding of a steel workpiece was performed under such conditions that the arc voltage was 18 to 38 v. and the welding current was 100 to 600 a., by using a composite wire having a core containing a deoxidizing flux as the electrode wire, and thus satisfactory results were obtained. Also, the no-gas arc welding of the steel workpiece was performed under such conditions that the arc voltage was 18 to 38 v. and the welding current was 100 to 600 a., by using a composite wire having a core containing a deoxidizing flux and a gas generating agent such as $CaCO_3$ as the electrode wire in the aforementioned equipment, and in that case, too, satisfactory results were obtained.

Table 1 shows examples of welding conditions for the case where the carbon dioxide gas shielded arc welding of steel plates 9 mm. in thickness was performed by using a carbon dioxide gas welding composite wire (HS–50A manufactured by Kobe Seikosho) and discharging $CO_2$ gas from the torch nozzle at a rate of 15 to 20 l/minute and the case where the no-gas arc welding of steel plates 9 mm. in thickness was performed by using a no-gas welding composite wire (OW-56 manufactured by Kobe Seisakasko). FIGS. 9 to 24 show the appearances of the resulting beads.

TABLE 1

| Welding position | Type of wire (diameter: mm.) | Welding current (ampere) | Arc voltage (volt) | Welded piece (numerals in the drawings) |
|---|---|---|---|---|
| Flat butt | HS–50A (3.2φ) | 400 | 25 | 9 |
|  | OW–56A (3.2φ) | 400 | 26 | 10 |
| Flat fillet | HS–50A (3.2φ) | 450 | 26 | 11 |
|  | OW–56A (3.2φ) | 450 | 28 | 12 |
| Horizontal fillet | HS–50A (3.2φ) | 420 | 24 | 13 |
|  | OW–56A (3.2φ) | 420 | 26 | 14 |
| Horizontal butt | HS–50A (2.4φ) | 180 | 21 | 15 |
|  | HS–50A (3.2φ) | 200 | 22 | 16 |
|  | OW–56A (3.2φ) | 190 | 24 | 17 |
| Overhead horizontal fillet | HS–50A (2.4φ) | 220 | 23 | 18 |
|  | HS–50A (3.2φ) | 260 | 22 | 19 |
|  | OW–56A (3.2φ) | 260 | 23 | 20 |
| Overhead fillet | HS–50A (2.4φ) | 170 | 21 | 21 |
|  | OW–56A (3.2φ) | 200 | 21 | 22 |
| Vertical fillet | HS–50A (2.4φ) | 150 | 21 | 23 |
|  | OW–56A (3.2φ) | 160 | 23 | 24 |

Figure 25:
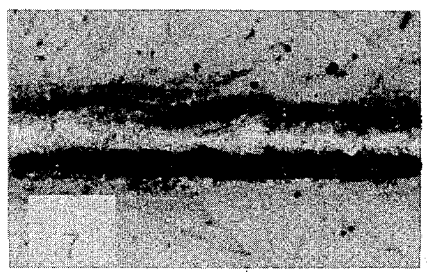
FIGS. 25 through 27 are photographs showing the appearances of beads produced by effecting semiautomatic welding with respect to stainless steel in accordance with the method of the present invention, respectively.
Figure 26:
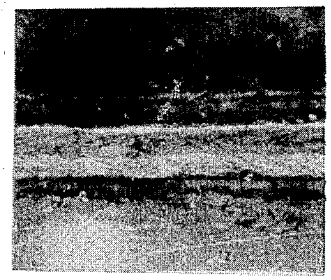
Figure 27:
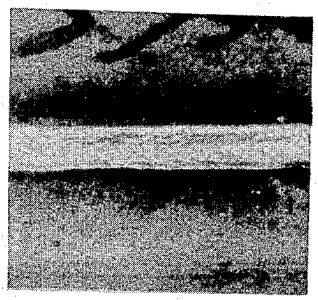

Table 2 shows an example of welding conditions for the case where the no-gas arc welding of stainless (SUS–27) was performed by using a no-gas welding composite wire (CN–308, 3.2 mm.Φ manufactured by Japan Arcos Co.). FIGS. 25 to 27 show the appearances of the resulting beads.

Table 2

| Welding position | Thickness of plate | Welding current (ampere) | Arc voltage (volt) | Welded piece (Numerals in the drawings) |
|---|---|---|---|---|
| Flat butt | 9 | 400 | 28 | 25 |
|  | 4 | 280 | 25 | 26 |
| Horizontal Fillet | 9 | 370 |  | 28 27 |

From the above experimental results, it has been found that in accordance with the present invention, automatic arc welding such as horizontal, flat, vertical, etc. which was difficult to achieve by the use of an AC welding power source having a drooping characteristic can be achieved without any trouble.

In any of the foregoing examples, a stabilized arc persisted, the peel off of slugs after the welding is improved, and the bead appearance can compare with that in the case of DC arc welding.

Figure 28:
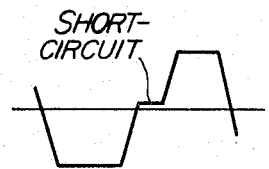
FIGS. 28 and 29 are views showing arc voltage waveforms occurring in the welding operation performed in accordance with the method of the present invention, respectively.
Figure 29:
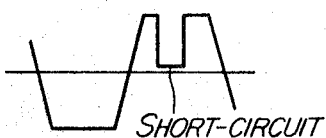

FIGS. 28 and 29 show the arc voltage waveforms occurring during the welding operation which were observed with the aid of an oscillograph, from which it will be seen that periodic short circuit took place at a frequency of 50 to 60 times per second. From this short-circuiting phenomenon and the peculiar spray sound caused by the arc during the welding operation, it is assumed that the mode of transfer of the molten metal in the above experiment was spray-type one accompanied by periodic short circuit.

Figure 30:
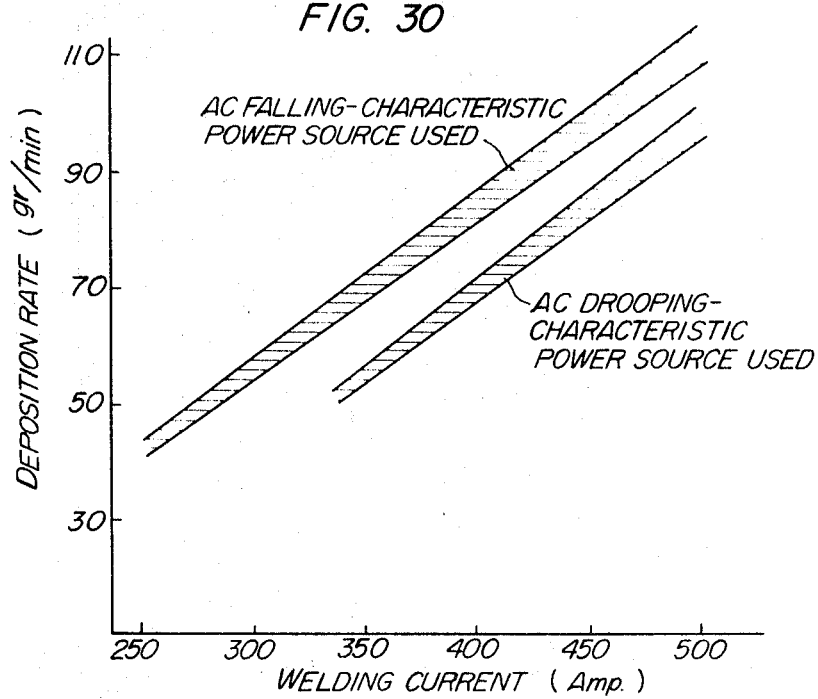
FIG. 30 is a graph showing the relationships between welding current and welding speed for the cases of the conventional method and present method.

FIG. 30 shows the relationship between the welding current and the deposition rate (the quantity of molten metal deposited per unit time) in the case of carbon dioxide gas shielded arc welding, from which it will be seen that the deposition rate is increased to about 20 percent by using an AC welding power source having a falling characteristic in accordance with the method of the present invention, as compared with the case where use is made of an AC welding power source having a drooping characteristic.

Figure 31:
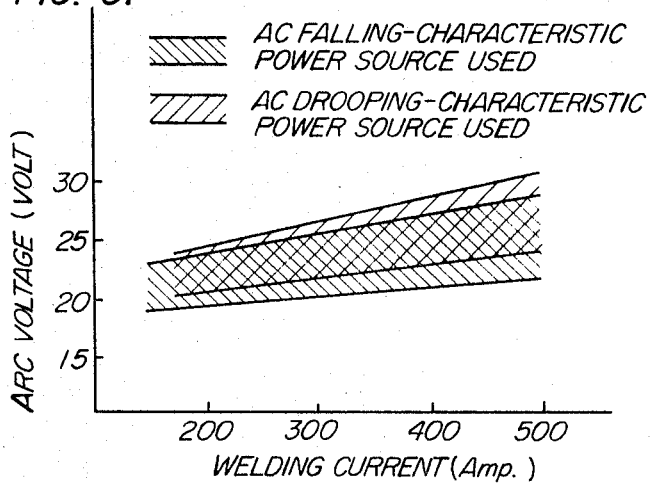
FIG. 31 is a graph showing the proper ranges of the welding conditions for the cases of the conventional method and present method.

FIG. 31 shows the ranges of the proper welding conditions for the case where use is made of an AC power source having a drooping characteristic in carbon dioxide gas shielded arc welding and the case where use is made of an AC power source having a falling characteristic, from which it will be seen that the range of the proper welding conditions becomes wider in the case where an AC power source having a falling characteristic is used than in the case where an AC power source having a drooping characteristic is employed, and that generally the arc voltage remains rather low. This means that even at a low arc voltage, that is, even when the arc length is short, a stable arc can be maintained. Thus, this has also constituted the causes that molten metal is hardly affected by atmospheric air on the way of transfer thereof to a workpiece so that it is less likely that defects occur in the weld, and that the deposition rate of an electrode wire can be increased.

Figure 32A:
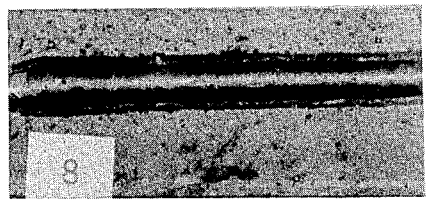
FIGS. 32a, 32b, and 33a, 33b are photographs showing examples of bead welds and spatter bonds produced by the conventional method and the present method, respectively.
Figure 32B:
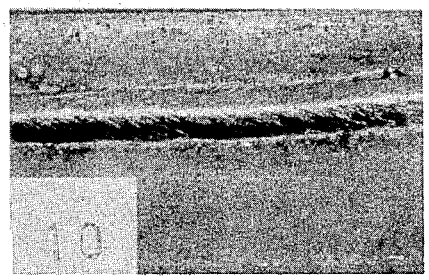
Figure 33A:
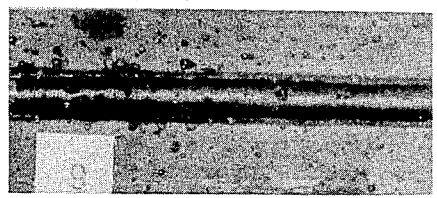
Figure 33B:
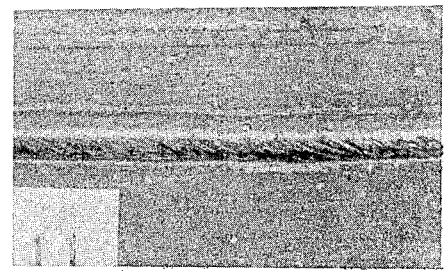

FIGS. 32a and 32b show the appearances of beads produced when soft steel was welded with an arc voltage of 27 v. and welding current of 450 a. available from an AC power source having a falling characteristic by using a no-gas welding composite wire (OW-56A), and FIGS. 33a and 33b show the appearances of beads produced when soft steel was welded under the same conditions as the above by using an AC power source having a drooping characteristic. From these figures, it will be seen that in the case of FIGS. 32a and 32b, a less quantity of spatter was deposited in the neighborhood of the beads, and that the size of the grains was smaller.

Further, as another example of the present invention, the two-electrode single-surface submerged welding according to the flux-backing method was effected by the use of an AC power source having a falling characteristic suited to the welding of a first layer wherein it is required that a stable arc be maintained with a low arc voltage and the welding of a second layer wherein an ordinary bead is formed with a slightly higher arc voltage. As a result, it has been found that a bead weld free from defects can be obtained as in the case where use is made of a DC constant voltage power source.

Figure 34:
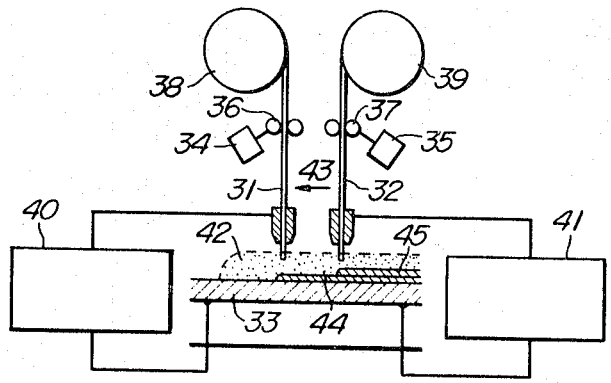
FIG. 34 is a view useful for explaining the present invention as applied to submerged arc welding.
Figure 35:
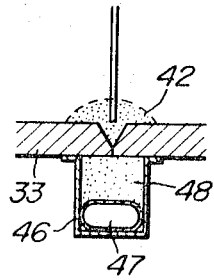
FIG. 35 is a longitudinal sectional view showing a weld formed in the case of submerged arc welding.

FIGS. 34 and 35 are views useful for explaining this. As shown in FIG. 34, a master electrode 31 and a slave electrode 32 were arranged on a workpiece in tandem along a welding line. Electrode wires were continuously fed from wire reels 38 and 39 to the workpiece by means of two pairs of feed rolls 36 and 37 driven by separate electric motors 34 and 35, respectively, and power was supplied to these electrode wires 31 and 32 by power sources 40 and 41 each having a falling characteristic respectively so that arc is produced between the respective electrode wires and the workpiece in flux powder 42. At this point, the slave electrode 32 was moved in a direction indicated by an arrow 43 so as to form a first-layer weld bead 44 by the molten metal of the master electrode 31 and a second-layer weld bead 45 by the molten metal of the slave electrode 32. As in the foregoing example, use was made of a system wherein a voltage proportional to the arc voltage of the respective electrodes is applied to the electric motors 34 and 35 and the wire-feeding speed is controlled in accordance with the arc voltage.

The backing strip for the workpiece was constituted by a flux-backing method wherein an airhose 47 was placed at the bottom of a channellike frame 46, flux powder 48 was spread thereon, and pressure air was introduced in the hose 47 thereby to press the flux powder 48 constituting single or multiple layers against the back surface of the workpiece 33, as shown in FIG. 35.

THE SPECIFICATION OF THE EQUIPMENT

| Power source for the main electrode | Secondary nonload voltage | 46 v. |
|---|---|---|
| | Maximum short circuit current (Refer to the curve B₁ in FIG. 36.) | 2,600 a. |
| Power source for the slave electrode | Secondary no-load voltage | 60 v. |
| | Maximum short circuit current (Refer to the curve B₂ in FIG. 36.) | 1,400 a. |
| Electrode wires | Solid wires, US-36 manufactured by Kobe Seikosho | |
| Flux | G85 manufactured by Kobe Seikosho | |
| Backing flux | RF-1 manufactured by Kobe Seikosho | |
| Parent metal | Soft steel (thickness: 19 mm.) | |

WELDING CONDITIONS

| | Welding current (ampere) | Arc voltage (volt) |
|---|---|---|
| Master electrode | 750 | 23-25 |
| Slave electrode | 800 | 38-40 |

From the observations on the oscillograph, it is assumed that the mode of transfer of molten metal was of the spray type.

Figure 36:
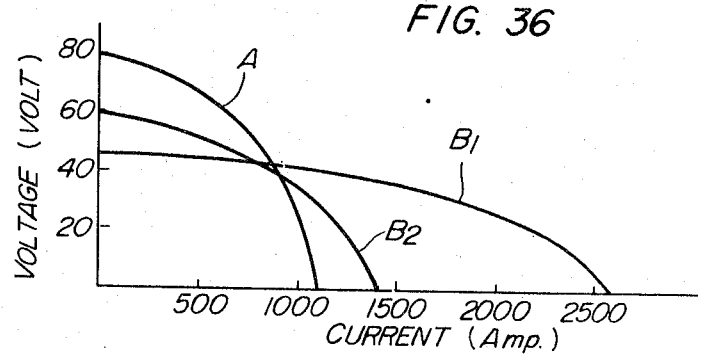
FIG. 36 is a view showing the external characteristic curve of a power source used for submerged arc welding.
Figure 37:
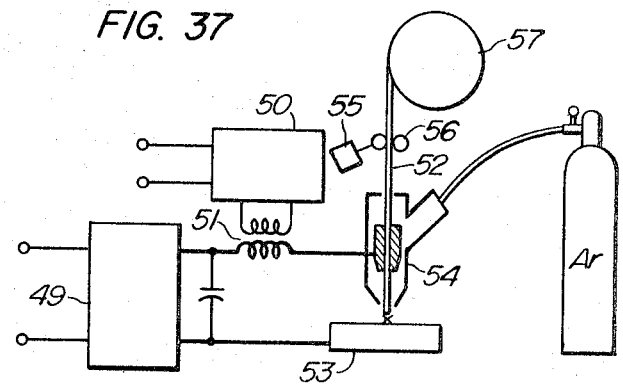
FIG. 37 is a connection diagram showing a welding equipment which is designed so that the present invention may be applied to argon gas-sealed arc welding.

In the case where use is made of an AC power source having such drooping characteristic as shown by the curve A in FIG. 36, the lower limit of the arc voltage at which a stable arc can be maintained is about 30 volts, while by using an AC power source having such falling characteristic as shown by the curve $B_1$ in FIG. 36, it is possible to maintain a stable arc even at a voltage as low as 21 to 23 volts by virtue of the self-controlling action of the arc. Thus, by using such falling-characteristic AC power source for the master electrode, it is possible to produce a uniform and defectless weld bead which cannot be attained by using an AC power source having a drooping characteristic.

Power source for the slave electrode may be an ordinary AC power source having such drooping characteristic as shown by the curve A in FIG. 36.

It is to be understood that the method of the present invention can equally be applied in an attempt to effect submerged arc welding by using a single electrode.

Description will now be made of the application of the present invention to the argon gas-shielded arc welding of light metal or light alloy by the use of small diameter solid wires.

In the case where use is made of no-flux solid wires, difficulty is encountered in maintaining an AC arc only with a commercial frequency voltage. Therefore, an AC welding power source having a falling characteristic was employed in combination with a high-frequency oscillator 50. Aluminum was welded in argon gas discharged from a torch 54 while applying between an electrode wire 52 and a base metal 53 a high-frequency voltage available from the high-frequency oscillator 50 in series to the secondary voltage through an air core coupling transformer 51. In this way, excellent welding results were attained which can pass the class A X-ray penetration test. The welding wire 52 was continuously supplied from a wire reel 57 to the torch 54 by means of feed rolls 56 driven by an electric motor 55, and the wire-feeding speed was controlled in accordance with the arc voltage so as to maintain the arc length constant. The specification of the equipment and welding conditions were as follows:

| Welding power source | Secondary no-load voltage | 42 v. |
| --- | --- | --- |
| | Maximum short circuit current | 1,000 a. |
| High-frequency oscillator | Frequency | 2 mc. |
| | Output | 30 w. |
| Electrode wire | 3.2 mmΦ aluminum wire | |
| Argon gas flow rate | 20 l/minute | |
| Base metal | Aluminum (thickness: 9 mm.) | |
| Welding current | 330 a. | |
| Arc voltage | 22 to 23 v. | |

The mode of transfer of the molten metal was of the spray type.

As described above, in accordance with the present invention, it is possible to remarkably improve the weldability of automatic arc welding effected by the use of an AC power source. Especially, in carbon dioxide gas-shield arc welding employing a composite wire, including a no-gas welding composite wire, it becomes possible to obtain a smooth welding bead with almost no spatter. Moreover, molten metal rarely drops from the electrode wire tip, thereby making it possible to perform the welding at any position, such as horizontal, vertical, and so forth. Thus, in accordance with the present invention, a DC welding power source which has heretofore been extensively used in these fields can be replaced with an inexpensive AC welding power source. This constitutes a great advantage from a standpoint of economy.

With a DC constant voltage power source, there is the tendency that the current is greatly varied with a slight change of the characteristic curve. In accordance with the present invention, however, it is possible to finely adjust the welding current by changing the slope of the characteristic curve, as will be seen from the curves B and B' in FIG. 2. Furthermore, the welding conditions can be easily selected since the effect of the characteristic of a power source on the welding results is not so remarkable as in the case where use is made of a DC power source.

We claim:

1. An automatic arc welding method for welding steel workpieces by providing an arc shielded with carbon dioxide gas between said workpiece and the tip of an electrode wire which is a composite wire having a core containing deoxidizing flux and is continuously fed to said workpiece by wire-feeding means comprising supplying alternating current arc welding power to said electrode wire from an AC welding power source having a slowly falling voltage-current characteristic starting from a no-load voltage of 35 to 45 volts and providing a current of 100 to 600 amperes, and automatically controlling the feeding speed of said electrode wire so as to maintain the arc voltage at a substantially constant value within a range of 18 to 38 volts for the arc current between 100 to 600 amperes, whereby the transfer of molten metal from said electrode wire to said workpiece is mainly dependent on a spray-type transfer.

2. An automatic arc welding method according to claim 1, in which said carbon dioxide gas is supplied to surround said welding arc from a gas reservoir through a nozzle of the welding torch.

3. An automatic arc welding method according to claim 1, in which the core of said composite electrode wire contains a gas-generating agent together with said deoxidizing flux, whereby said carbon dioxide gas is supplied to said welding arc from said composite wire itself.

* * * * *